United States Patent [19]

Mendler, III

[11] Patent Number: 4,666,383
[45] Date of Patent: May 19, 1987

[54] ROTARY MACHINE

[76] Inventor: Edward C. Mendler, III, 60 Shaw Dr., Wayland, Mass. 01778

[21] Appl. No.: 632,725
[22] PCT Filed: Aug. 15, 1983
[86] PCT No.: PCT/US83/01244
   § 371 Date: Apr. 26, 1984
   § 102(e) Date: Apr. 26, 1984
[87] PCT Pub. No.: WO84/00993
   PCT Pub. Date: Mar. 15, 1984

Related U.S. Application Data

[63] Continuation-in-part of Ser. No. 411,668, Aug. 26, 1982, abandoned, and a continuation-in-part of Ser. No. 501,324, Jun. 6, 1983, abandoned.

[51] Int. Cl.[4] .............................................. F01C 19/02
[52] U.S. Cl. ..................................... 418/115; 123/246; 418/142; 418/159; 418/204
[58] Field of Search ................ 277/25, 81 P; 418/113, 418/115

[56] References Cited

U.S. PATENT DOCUMENTS 3,707,340 12/1972 Brille ..................................... 418/115
3,721,510 3/1973 Gilbert .............................. 418/115 X
3,904,332 9/1975 Clough ................................. 418/115
4,296,936 10/1981 Wankel ................................ 277/81 P Primary Examiner—Michael Koczo

[57] ABSTRACT

Rotary machines of the type having a fluid chamber of changing volume, e.g. as ion an engine or pump, in which two rotors rotate in the same direction; a cylindrical surface of the first rotor of substantial arcuate extent, of radius substantially equal to the radius of its bore is arranged for sealing relationship throughout a chamber-defining range of rotation, with both its bore wall and with a surface of the second rotor; and the surface of the second rotor has a progressively changing radius to cause the chamber volume to progressively change during rotation. For forming multiple chambers, each subject to successive compression and expansion, each of the rotors has a transition surface preceding its large cylindrical surface and a transition surface following its large cylindrical surface, with an apex seal formed at each end of each large cylindrical surface. Preferably a small cylindrical surface on each rotor between the two transition surfaces seals against the large cylindrical surface of the other rotor during rotation. Useful in other machines as well, the rotor carries movable sealing members which apply against an opposed surface sealing pressure that decreases in magnitude with increase in rotational velocity, with restraint to control sealing movement. Other sealing configurations are described. Also a variable member defining part of the bore surface is movable relative to the rotor by means responsive to desired operating conditions to vary the point where the rotor and surface begin or end a sealed relationship.

5 Claims, 50 Drawing Figures

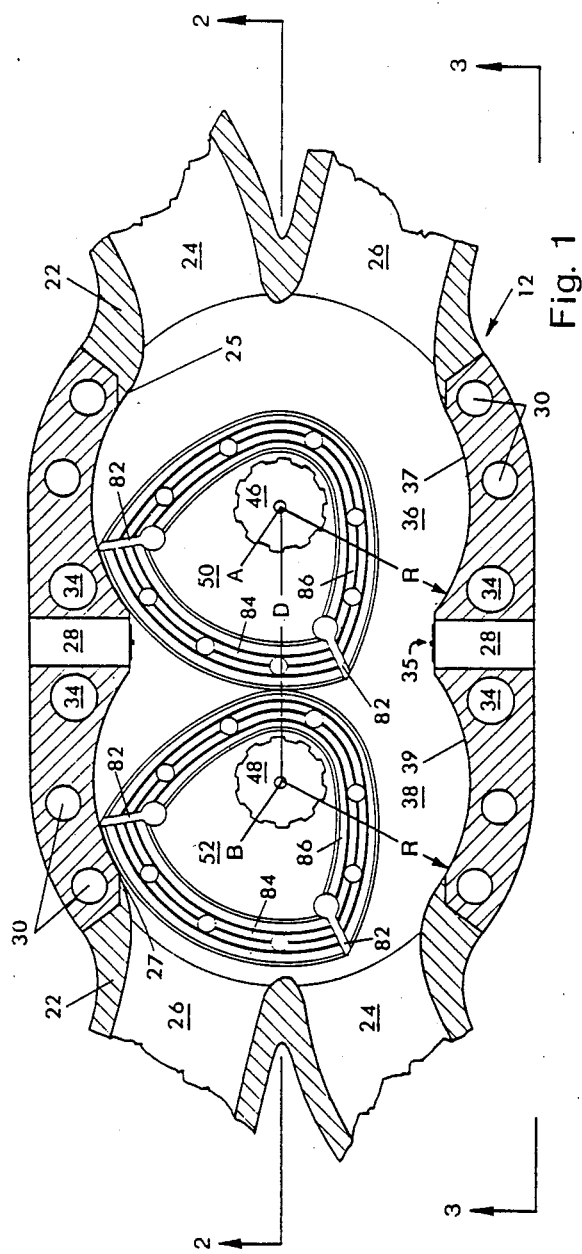
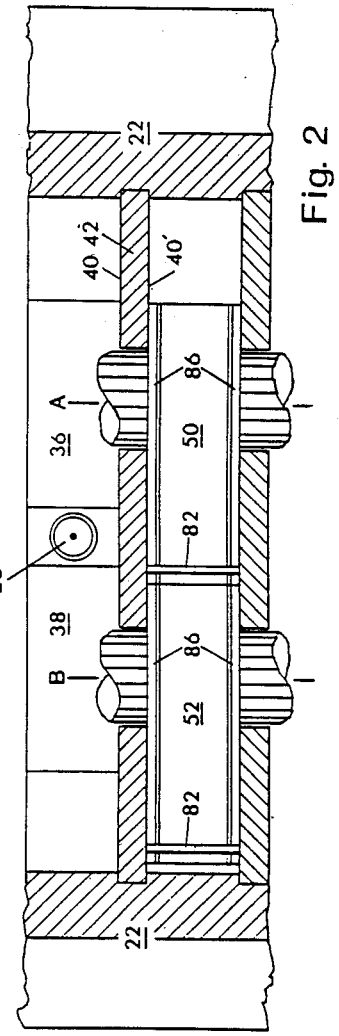

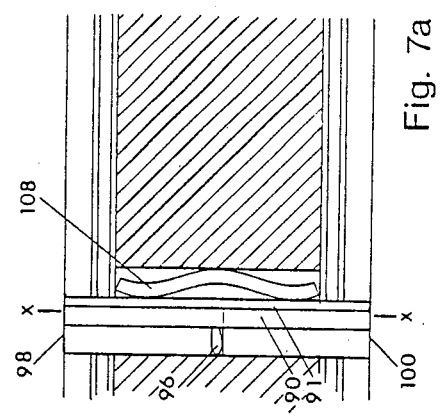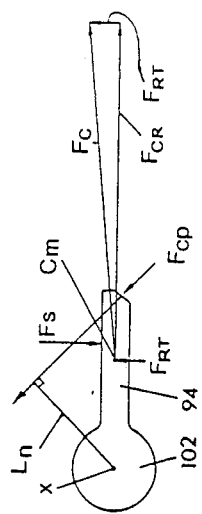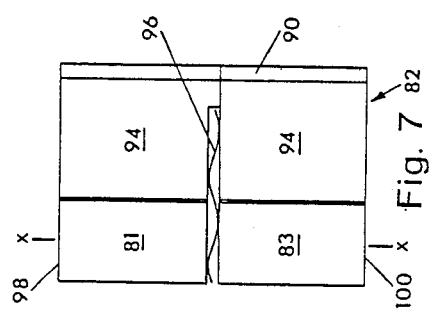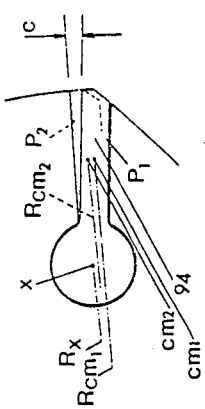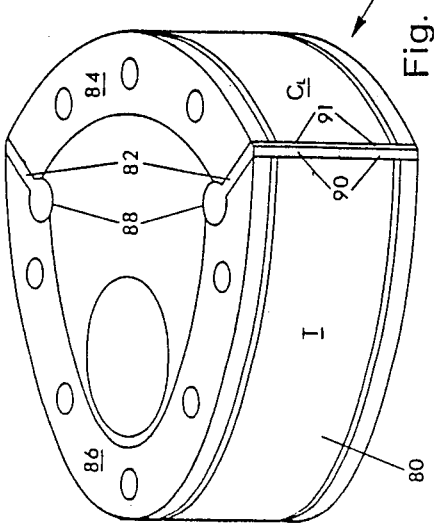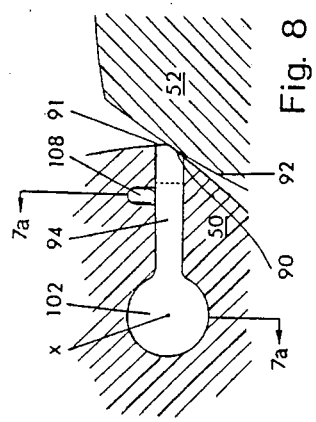

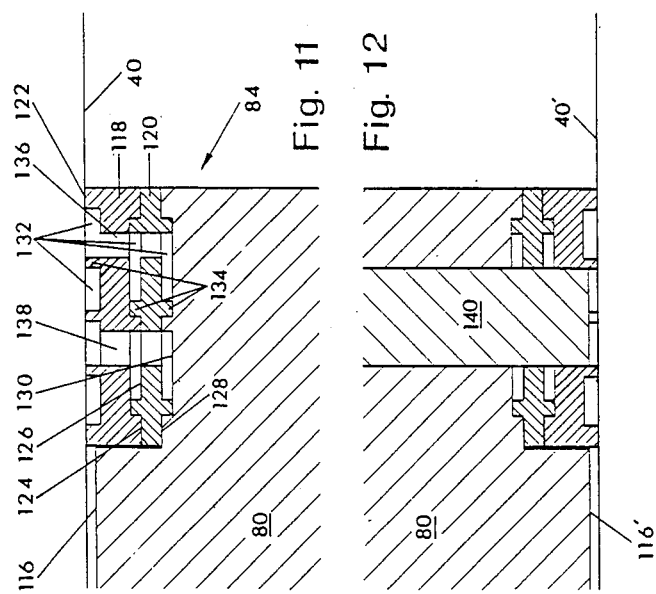
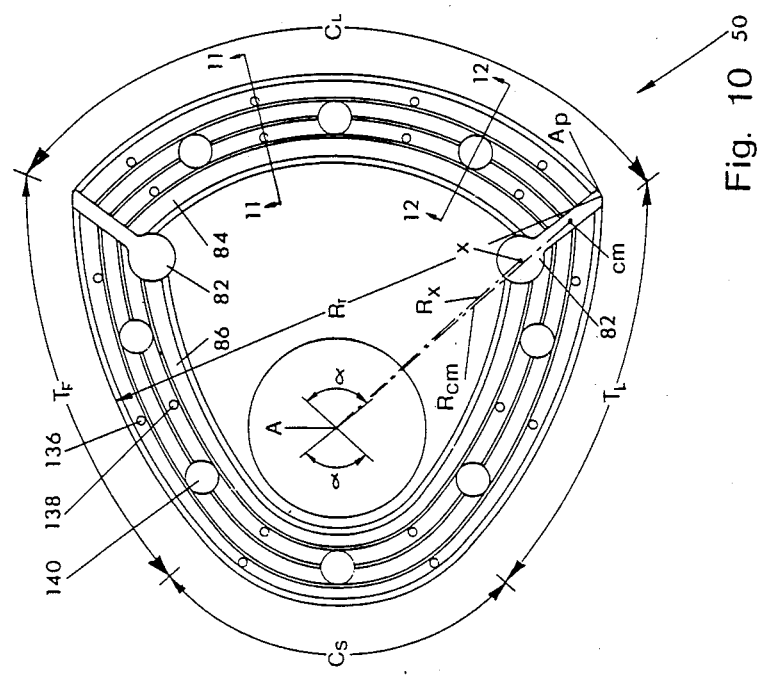

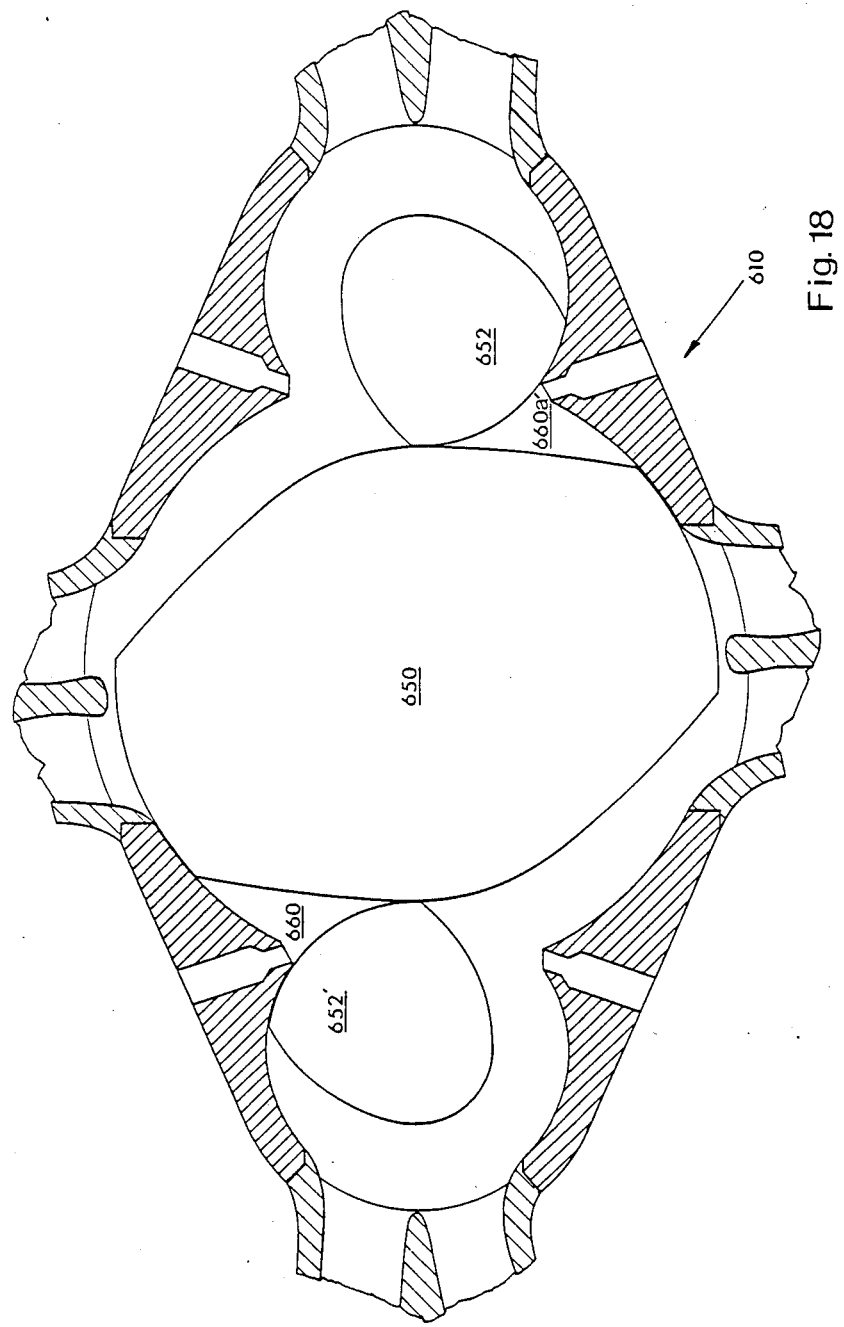

ROTARY MACHINE

This is a continuation-in-part of application Ser. No. 411,668, filed Aug. 26, 1982, abandoned, and a continuation-in-part of application Ser. No. 501,324 filed June 6, 1983, abandoned.

BACKGROUND OF THE INVENTION

The invention relates to rotary machines that have a fluid chamber of changing volume, as in an engine or a pump.

Rotary machines of this type employ a rotating surface to have a working relationship with a fluid, e.g. compression or expansion. In the case of an engine, the machine also generates shaft energy as where a compressed gas and fuel mixture is ignited for explosive expansion within the chamber of the machine.

Prior rotary machines have typically employed one eccentric rotor or multiple adjacent rotors that turn in opposite directions so that adjacent rotor surfaces move in the same direction; however, machines having rotors turning in the same direction have been suggested.

SUMMARY OF THE INVENTION

In detail, the invention applies to a rotary machine which comprises a rotor and means defining a bore surface with which the rotor is arranged to interact to cylically define a fluid chamber during rotor rotation.

According to the invention, a variable member defining a portion of the bore surface is movable toward and away from the rotor in the manner to vary the rotational position of a transition point at which a sealed relationship between the rotor and the bore surface begins or ends, and means responsive to desired operating conditions to vary the position of the variable portion thereby to vary the rotational position of the point at which the sealed relationship begins or ends.

In preferred embodiments, the rotary machine is in the form of a rotary internal combustion engine in which the rotor and bore surface are cooperatively constructed to form at least part of a combustion chamber, the variable member defining with the rotor the point where the volume of the combustion chamber is first closed, variation in the position of the member serving to vary the compression ratio of the engine; and the bore surface is comprised in part of a relatively stationary first bore surface segment of radius which progressively enlarges relative to the radius of the rotor at points at progressively greater arcuate distance about the rotor axis from the point of the segment which lies closest to the rotor, the variable member defining a second bore surface segment which is movable outwardly relative to the first segment and has a transition end portion disposed closely adjacent to the relatively stationary segment, the transition end portion being movable along the first bore surface segment as the variable member moves outwardly from the rotor axis to expose an increasing amount of the first bore surface segment, preferably the variable member is pivotable about a pivot axis lying directly outwardly from the first bore surface segment and, the first bore surface segment is cylindrical, centered on the pivot axis, more preferably the second bore surface segment defined by the variable member is an arcuate surface of radius substantially equal to the radius of the rotor, and the machine further includes a flexible fairing member disposed at the outward end of the variable member, and a positioning means adapted to selectively position the variable means.

In a further preferred embodiment, the invention applies to a rotary machine that cyclically defines a chamber of progressively changing volume by means of a pair of co-acting rotors. The rotors are mounted for dependent rotation on parallel axes of adjacent cylindrical bores formed in a block, the axes being spaced apart a distance less than the sum of the radii of the bores. The rotors have surfaces adapted to provide a progressive rotor-to-rotor seal while each rotor also forms a rotor-to-bore-wall seal and face-to-end-closing-surface seals, the rotor surfaces in cooperation with the other surfaces of the machine defining the chamber.

According to the invention of this preferred embodiment, in combination, the rotors rotate in the same direction, a cylindrical surface of the first rotor, of radius substantially equal to the radius of its bore and having substantial arcuate extent, is arranged in sealing relationship with its bore wall and with a surface of the second rotor, at least part of the surface of the second rotor exposed to this chamber has a progressively changing radius to cause the chamber volume to progressively change during rotation, and the rotor surfaces are constructed to avoid interfering contact.

In the case of a machine in which the chamber has successive compression and expansion stages, as in an internal combustion engine, on the second rotor the transition surface (upon which the apex of the first rotor formed a seal during the compression stage) is followed by a large cylindrical surface, and on the first rotor the large cylindrical surface is followed by a transition surface. A second seal-forming apex is defined between the transition and cylindrical surfaces on the second rotor. Thus as the rotors continue their rotation after decreasing the chamber volume, the apex of the second rotor moves into sealing relationship along the trailing transition surface of the first rotor, while this transition surface moves apart from the cylindrical surface of the second rotor, to cause the volume of the chamber to expand. In a preferred form for forming multiple chambers, each subject to successive compression and expansion, each of the rotors has a transition surface preceding its large cylindrical surface and a transition surface following its large cylindrical surface, with an apex formed at each end of each large cylindrical surface. Different sets of surfaces and apexes, during different stages of rotation, thus can form chambers.

In many preferred cases, for both expansion and compression machines and in machines having combinations of such stages, to enable a chamber to be formed for an extended duration of rotation of the rotors, and to provide large ratio between smallest and largest volume of the chamber, the second rotor has a minor cylindrical surface beyond the small end of the transition surface, of radius substantially equal to the difference between the length of the line of centers of the rotors and the radius of the cylindrical surface of the first rotor. This minor cylindrical surface is arranged to be at the line of centers when the large cylindrical surface of the first rotor is at the line of centers, thereby to form a seal.

In one preferred case, the rotors are of identical size and shape with all of the features mentioned above and rotate at the same speed to form a pair of spaced-apart chambers.

In preferred embodiments of the foregoing machine, the sealing members at each apex are adapted to apply against the opposed surfaces outward sealing pressure that decreases in magnitude with increase in the velocity of rotation. To achieve this action, preferably the rotor-contacting surface of the sealing member is free to move in response to intertial effects. Preferably, the sealing member is free to slightly swing between first (rest) and second (high speed) positions about a pivot region that is positioned inwardly from the periphery of the rotor, the pivot region being offset from a radius of the rotor that projects to the center of mass of the sealing member. By novel selection of the position of the center of mass of the sealing member, relative to the radius leading to the contact surface of the sealing member and the radius through the pivot axis, the motion of the sealing surface can be made to be mostly tangential or mostly radial depending upon the needs of the particular embodiment.

In preferred embodiments of the sealing member: it is a rigid element extending outwardly from a rotating pivot bearing, the sealing member being biased toward the first position by an indepndent spring means, or is a cantilever spring portion capable of flexing generally in the pivot region in response to centrifugal effects; the force of the spring is progressively overcome by centrifugal effects as the rotor increases in speed; and in the preferred rotary machine of the invention, the second (high speed) position of the sealing surface relative to the first position is positioned tangentially in the direction of the major cylindrical surface of its rotor and away from its transition surface.

A further important feature of the invention is that the described sealing member, at a given speed of rotation of the rotor, can be constructed and arranged to bear against the transition surface with pressure normal to the transition surface which varies generally inversely with change of volume of the chamber.

According to another aspect of the invention, the sealing member described above may be used in conjunction with any rotary device to form a seal with an opposed surface, the seal being constructed and arranged, preferably as earlier described, to respond to rotational speed to relieve sealing pressure as speed increases.

In another aspect, the invention applies to a rotary machine which oomprises a rotor, means defining a complementary, opposed surface, and a sealing member bodily carried by the rotor member and movable with respect to the rotor member toward the complementary surface to form a seal therewith, the point of sealing of the sealing member progressing about the surface as the rotor rotates.

According to this aspect of the invention, restraint means are responsive to increase in the rotational rotor speed to apply increased restraint on the freedom of relative motion of the sealing member toward the surface thereby to enable decrease or elimination of direct pressure contact between the sealing member and the surface upon increased rotor speed.

In preferred embodiments of this aspect of the invention, the restraining means comprises a restraint member carried by the rotor and defining a friction brake surface engageable with the sealing member in a manner to restrain movement of the seal member, the restraint member being responsive to increase in centrifugal force attributable to increased speed of rotor rotation, to increase the pressure of engagement of the friction brake surface upon the sealing member, thereby to increase the restraint of the sealing member, preferably the sealing member comprises a member having a rotary bearing surface bearing upon a corresponding surface defined by the rotor, the sealing member extending from and rotable with the rotary bearing surface to move into sealing engagement with the complementary surface, the restraint member comprising a member lying inwardly of the sealing member, the restraint member having a surface engaged for relative motion with a corresponding surface of the sealing member, the restraint member being constrained against rotation with the sealing member and disposed to respond to increase in centrifugal force to engage the sealing member with increased pressure, thereby to frictionally restrain rotation of the sealing member toward the complementary surface.

In a further aspect, the invention applies to a rotary machine which comprises a rotor and means defining relatively stationary surfaces with which the rotor is arranged to interact to cyclically define a fluid chamber during rotor rotation.

According to this further aspect of the invention, the rotor includes a seal means for providing a sealing relationship with a complementary stationary chamber surface during rotary motion of the rotor, the seal means being comprised of at least one sealing member carried on the rotor and defining a sealing surface disposed in face-to-face relationship with the complementary surface, the bias means between the member and the rotor adapted to bias the sealing member toward the complementary surface, the bias means having a biasing portion with at least a component lying perpendicular to the radius of the rotor and a point of attachment spaced from the biasing portion, which is adapted and configured to apply a biasing force to the sealing member toward said complementary surface, the dimensional extent of the biasing portion in a direction perpendicular to the radius of the rotor at a first speed of rotation being different from the dimensional extent at a second speed of rotation, the biasing portion adapted to move elastically between positions at first and second speeds of rotation in response to increase of centrifugal force thereon, the biasing force applied by the biasing portion to the sealing member varying with variation in dimensional extent.

In preferred embodiments of this further aspect, the bias means is a corrugated, relatively flat, resilient member attached to the rotor at a point along the length of the bias means inward of the center of mass of the bias means, the outer end of the bias means having a dimensional component perpendicular to a radius of the rotor, whereby, due to said perpendicular dimensional component, the bias means, when the rotor is at rest, biasing a sealing member toward a complementary stationary surface, and when the rotor is rotating at a different, higher speed, the outer end of the bias means is urged radially outward by centrifugal force thereby reducing its perpendicular dimensional component and reducing the biasing force of the bias means toward the sealing member, and the sealing member comprises a plurality of flat sealing members disposed in axially superposed relationship, there being bias means between each pair of said flat sealing members and between said rotor and its adjacent said flat sealing member, adapted to bias the respective members apart, whereby the total clearance is divided between a plurality of small, flow-resistant gaps.

In still another important aspect of the invention, end seals for the machine comprises substantially flat seal elements disposed on the rotor in face-to-face relationship with the end-closing surface of the bore, with means between the seal and the rotor to bias the seal element toward the end closing surface.

In preferred embodiments of this aspect of the invention, a surface of the seal defines at least one recess whereby fluid passing from a zone of high pressure to a zone of lower pressure across the seal surface encounters an enlarged volume with pressure of intermediate magnitude, the seal surface adapted to isolate the recess to maintain the pressure therein at the intermediate magnitude. Preferably a plurality of isolated recesses are provided to be encountered successively by the passing fluid, the pressure in the recesses being of progressively decreasing magnitude from the region of high pressure to the region of lower pressure along the fluid path. In some instances, a recess is provided in a fluid path across a surface remote from the sealing surface, the fluid under pressure in this recess being effective to bias an overlying seal toward the end surface; preferably recesses defined on different surfaces are connected axially through the seal, whereby the pressures in the recesses can be nearly balanced to maintain equal sealing effectiveness through the various axial gaps.

In some cases it is advantageous to employ a plurality of substantially flat sealing members, in face-to-face relationship to divide the total clearance gap in the axial direction into a plurality of smaller clearance gaps, thereby to increase the effective viscous resistance to leakage flow and thus reduces leakage.

In detail of a still further aspect of the invention, a machine comprises a moving element and means defining a fixed surface with which the moving element is arranged to interact to cyclically define a fluid chamber during movement of the element, a surface of the element and the fixed surface adapted to be disposed in close-mated relationship to retard movement of fluid therebetween between the fluid chamber and an area of different pressure.

According to this aspect of the invention, a multiplicity of grooves defined in a fixed surface are configured and arranged to permit fluid moving between surfaces in close-mated relationship from a first area of relatively high pressure to a second area of relatively lower pressure to pressurize the grooves in progression from the first area toward the second area, and the grooves defined in the fixed surface are configured and arranged to provide that movement of element surface in close-mated relationship with the fixed surface is adapted to progressively expose the grooves to the fluid chamber, whereby as leakage of fluid between the close-mated surfaces from the area of relatively higher pressure to a first groove defined in the fixed surface adjacent to the area of relatively higher pressure increase the pressure therein, movement of the element causes the first groove to be exposed to the area of higher pressure, thereby increasing the sealing performance of the close-mated surfaces.

PREFERRED EMBODIMENT

The structure and operation of certain preferred embodiments of the invention will now be described, after describing the drawings.

DRAWINGS

FIG. 1 is a cross-sectional view of a segment of a preferred internal combustion engine according to the invention taken on line 1—1 of FIG. 3 showing the rotors full rather than in cross-section;

FIG. 1a is a similar view of an engine with variable compression ratio taken at the line 1a—1a of FIG. 3a;

FIG. 2 is an axial cross section taken on line 2—2 of FIG. 1, again showing the rotors full rather than in cross-section, and also showing part of a second segment of the engine without rotors;

FIG. 2a is a similar view of the engine having variable compression, taken at line 2a—pk 2a of FIG. 3a;

FIG. 6 is an isometric view of a rotor removed from the engine, not showing spline teeth or labyrinth grooves;

FIG. 7 is a side view of an apex seal employed in the rotor of FIG. 6;

FIG. 7a is an axial view of the bias spring of the apex seal the apex seal and spring being shown in full the rotor being taken in section on the line 7a—7a of FIG. 8;

FIG. 8 is a diagrammatic plan view partially in section of the apex seal of the rotor of FIG. 6 acting upon the surface of the mating rotor;

FIG. 8a is a similar view, of an apex seal with restraining means, while

FIG. 9 is a diagrammatic view of the apex seal of FIG. 8, suggesting its movement in use;

FIG. 9a is a free body diagram of the apex seal member of FIG. 8;

Figure 1A:
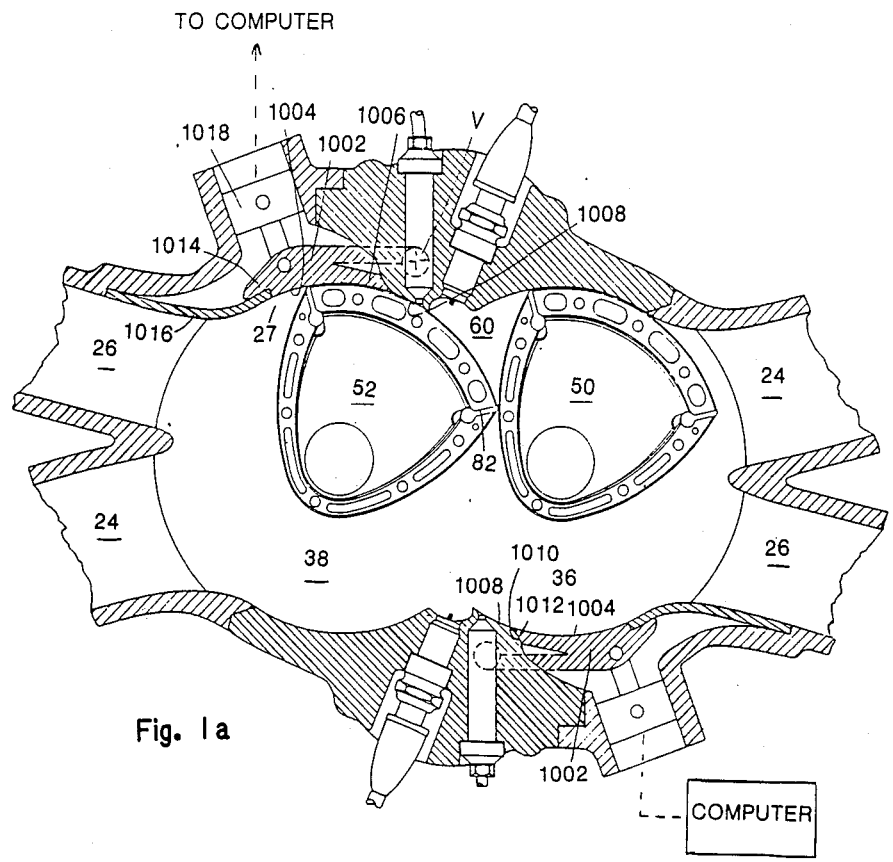
Figure 1B:
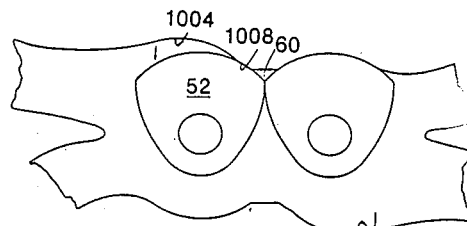
FIG. 1b and 1c are diagrammatic views of the engine of FIG. 1a at different compression ratios.
Figure 19:
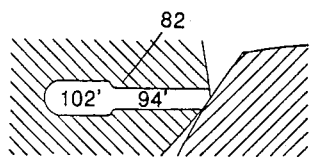
Figure 10A:
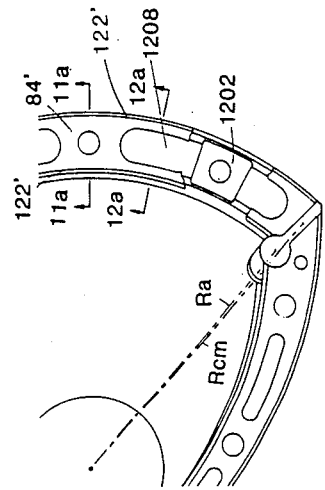
Figure 10B:
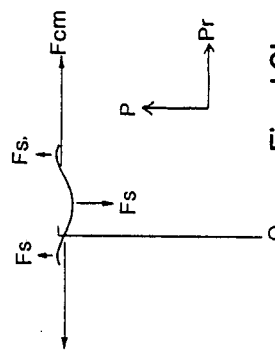
Figure 11A:
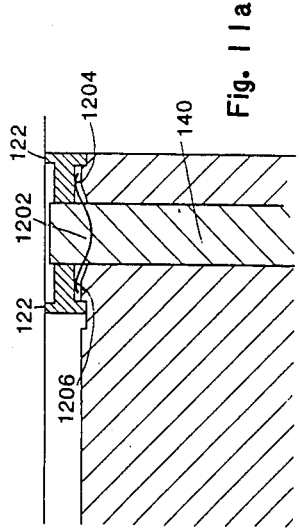
Figure 12A:
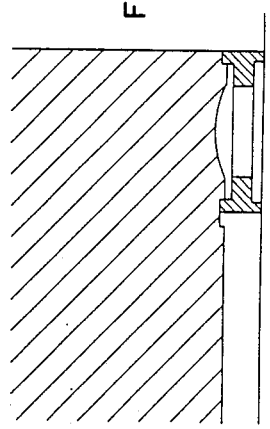
Figure 11B:
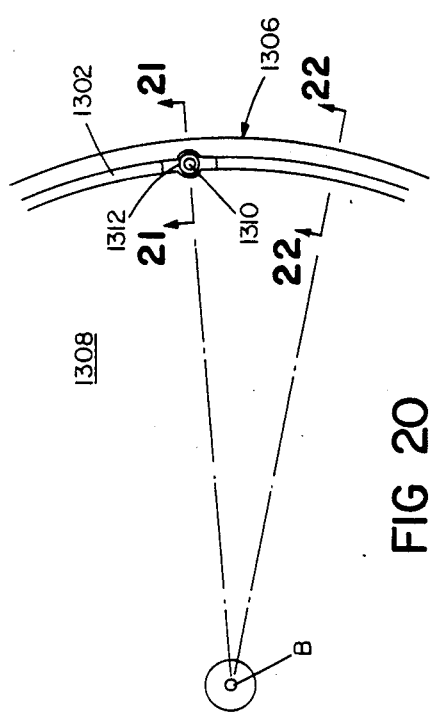
Figure 12B:
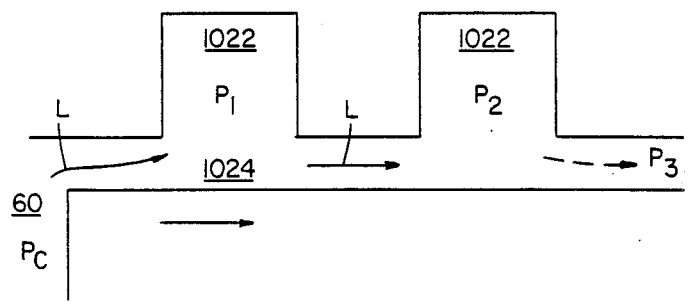
Figure 12C:
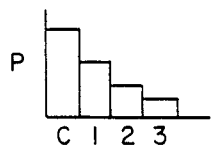
Figure 12D:
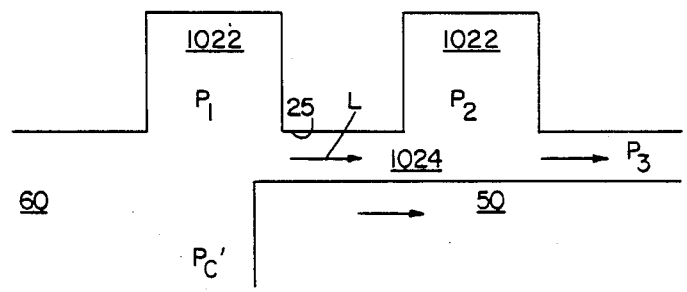
Figure 12E:
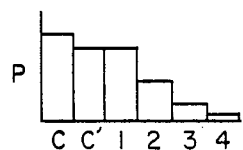
Figure 13:
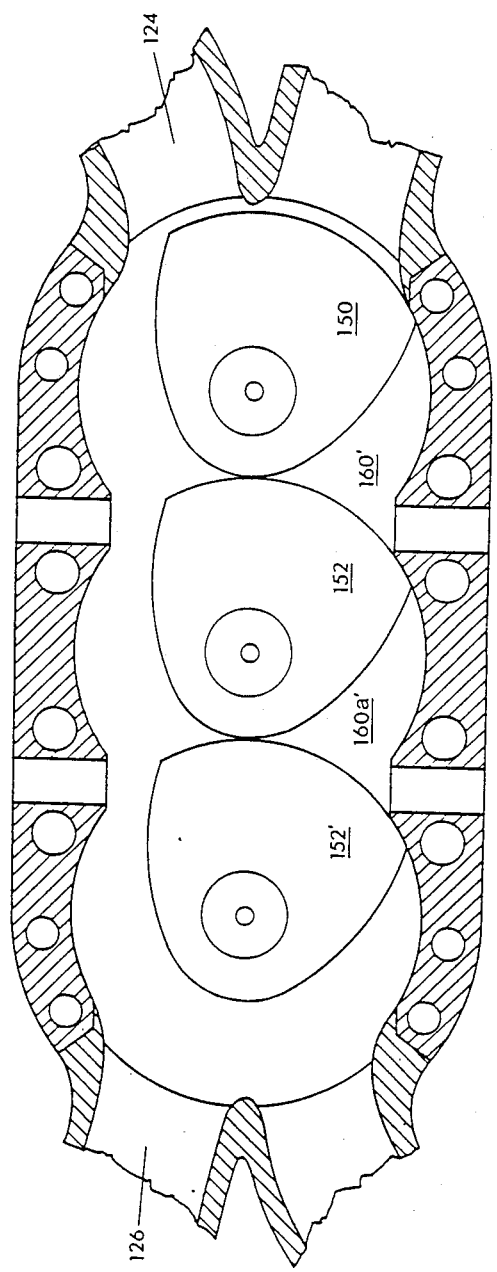
Figure 14:
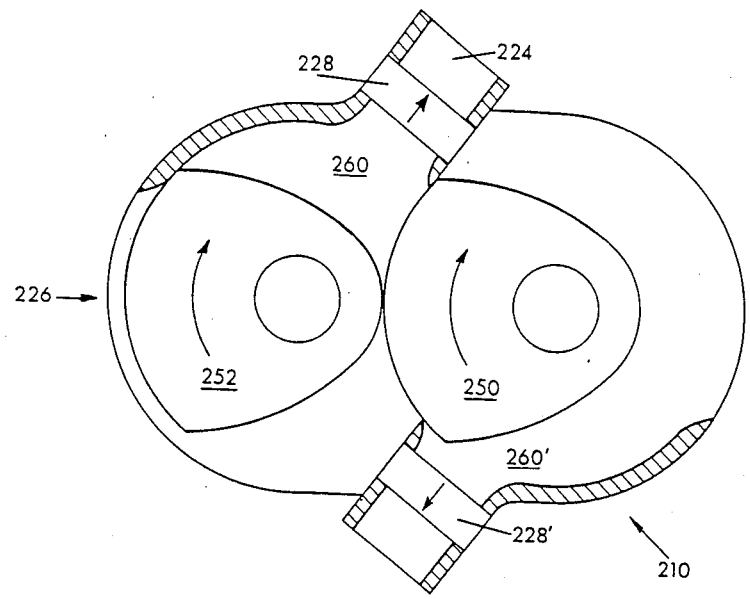
Figure 15:
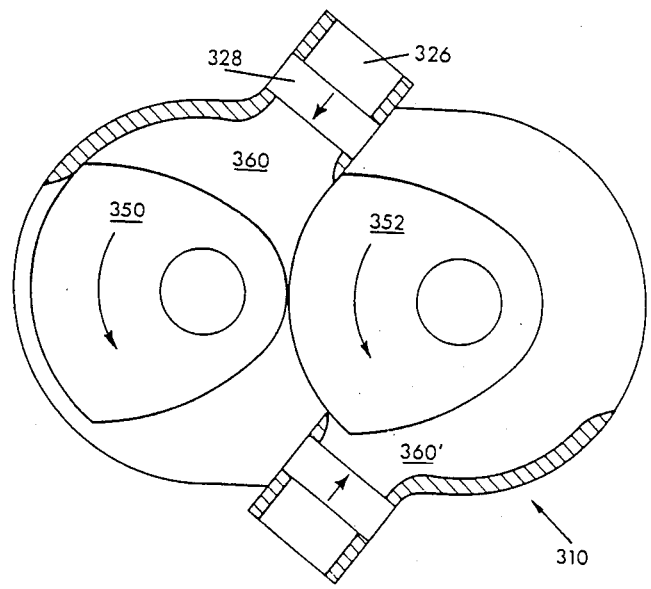
Figure 16:
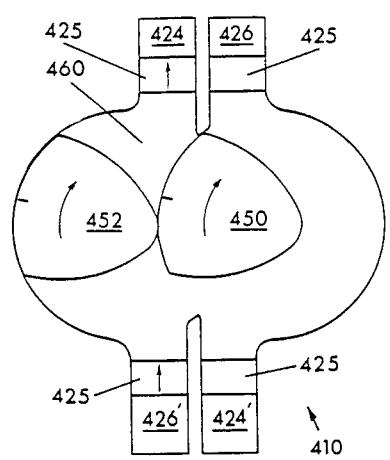
Figure 16A:
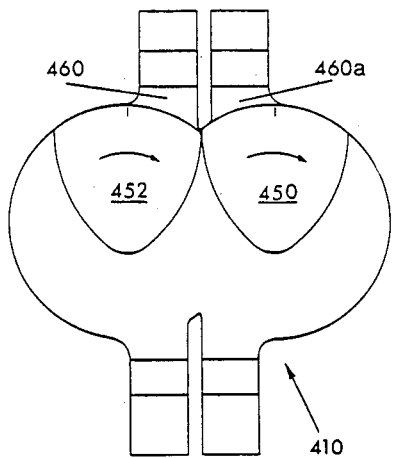
Figure 16B:
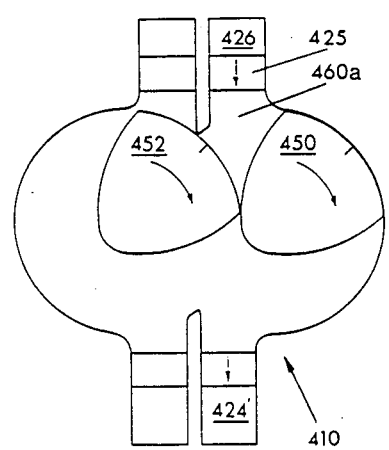
Figure 16C:
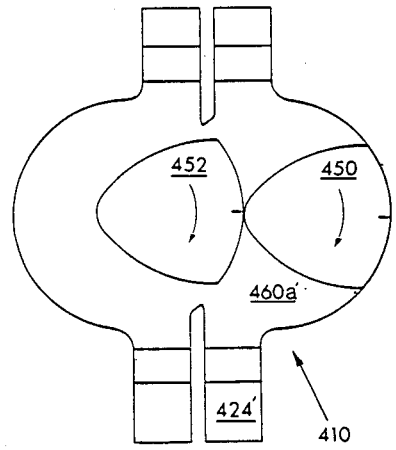
Figure 17:
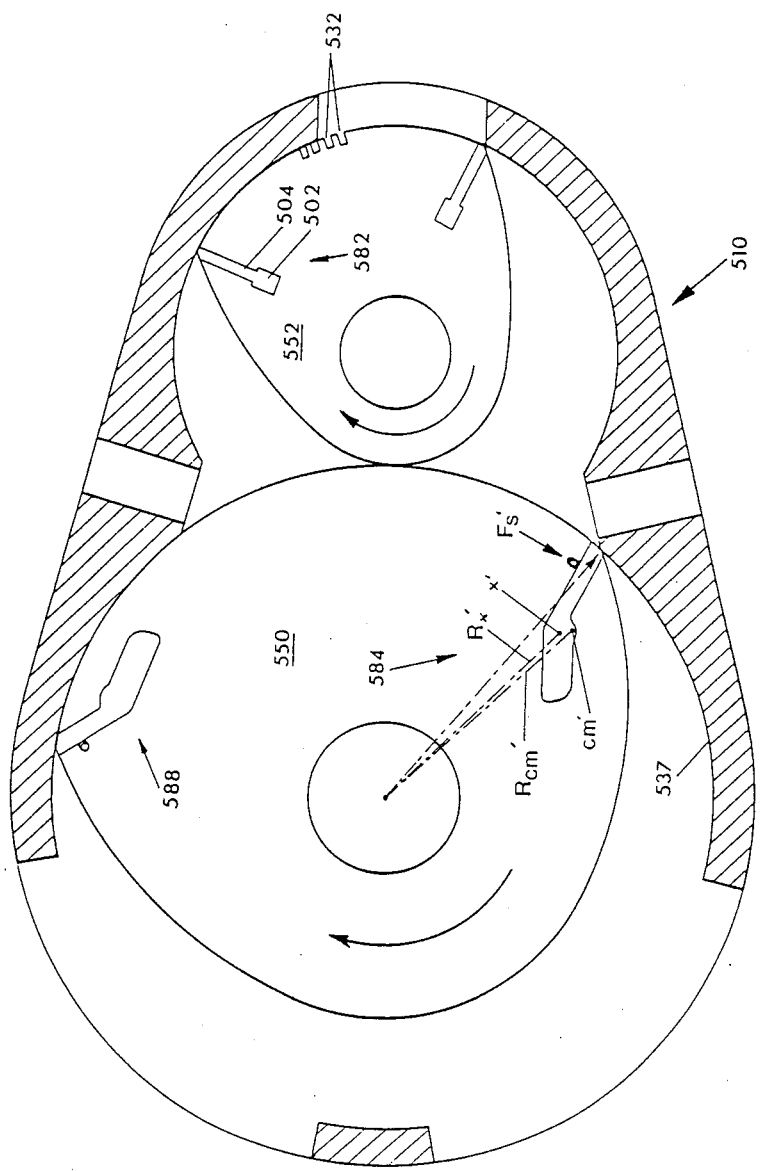

FIG. 10 is a plan view on enlarged scale of a single rotor of FIG. 1, omitting the spline teeth, while FIGS. 11 and 12 are partial axial cross-sectional views taken on lines 11—11 and 12—12 respectively, of FIG. 10;

FIG. 10a is a plan view of a rotor cut away to show the bias means, FIG. 10b is a force diagram, while FIGS. 11a and 12a are partially axial cross-sectional views taken on lines 11a—11a and 12a—12a respectively of FIG. 10a;

FIG. 11b is view similar to FIG. 11a of an alternative embodiment;

FIGS. 12b and 12d are enlarged representation views of the opposed rotor and fixed bore wall seals with, the leak retarding system of FIG. 1b, while FIGS. 12c and 12e are bar graph representations of the pressures in FIGS. 12b and 12d, respectively;

FIG. 13 is a cross-sectional view similar to FIG. 1 of another preferred embodient employing three rotors;

FIG. 14 and 15 are views of an identical pump structure adapted, respectively, by virtue of opposite rotation, to compress or expand the chamber;

FIGS. 16 through 16c are sequential diagrammatic views of the preferred embodiment of a liquid pump having stages creating suction and pressure;

FIG. 17 is a cross-sectional view of a further embodiment employing rotors of unequal size but of identical revolutionary speed;

FIG. 18 is a cross-sectional view of a three rotor machine employing small outer rotors and a larger central rotor which rotates at one half the speed of the outer rotors;

FIG. 19 is a top section view showing an alternate apex seal construction; and

Figure 20:
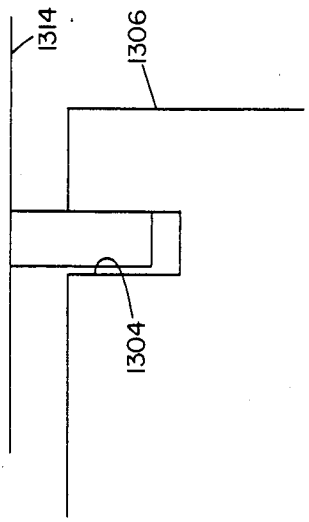
Figure 22:
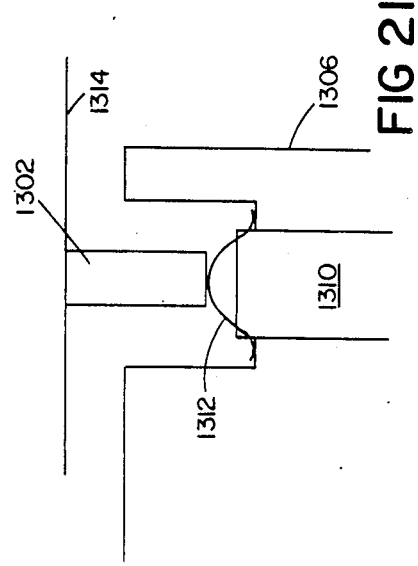
Figure 21:
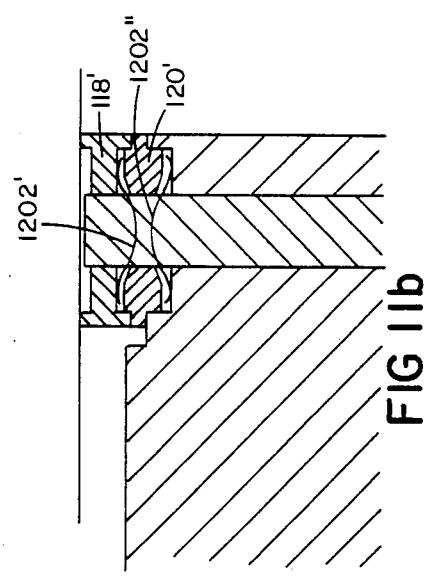

FIG. 20,is a diagrammatic view of an alternate embodiment of a biased force seal, while FIGS. 21 and 22 are side views taken at the lines 21—21 and 22—22, respectively thereof.

STRUCTURE AND OPERATION

Referring to FIGS. 1 through 4, engine block 10 is comprised of block segments 12 and 14, gear-and-bearing segments 16 and bearing segments 18. Power shafts 20 and 20' extend from respective ends of block 10.

Figure 3A:
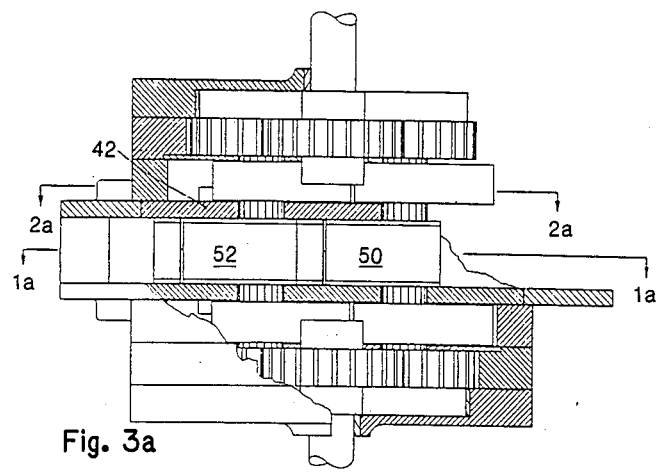
FIG. 3a is a diagrammatic side view partially in section of a two-chamber engine block with variable compression.
Figure 3:
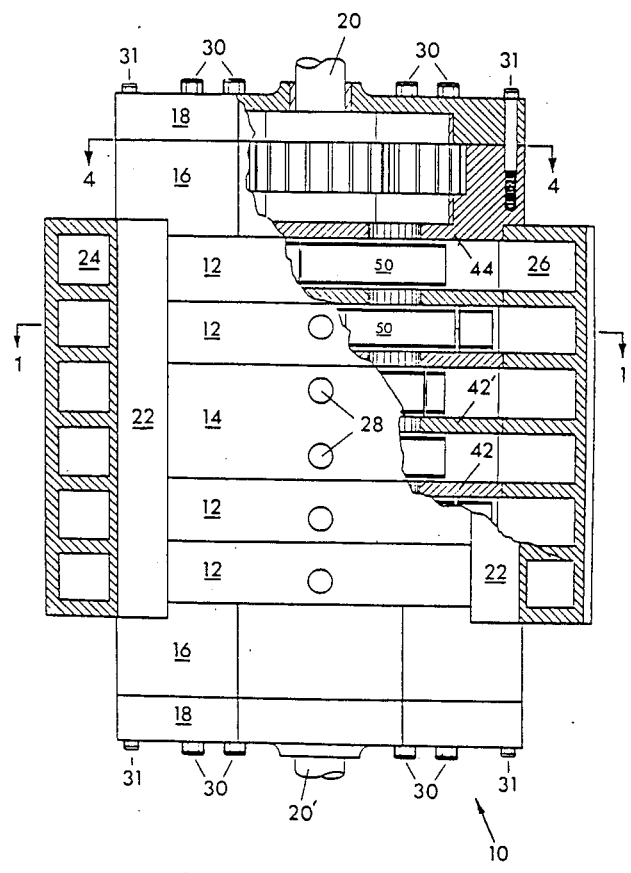
FIG. 3 is a diagrammatic side view partially in section of a complete engine having six segments in accordance with FIG. 1.

Referring to FIGS. 1 and 3, the exhaust and intake manifolds 22 defining exhaust passages 24 and intake passages 26 on each side of the block are formed by unitary castings which extend substantially throughout the combined height of segments 12 and 14 of block 10 and service the combustion chambers formed in these block segments. Fuel injection port and/or ignition means 28 for each segment is shown in the center. Bolts 30 extend through the block and hold the segments together. Bolts 31 extend through blocks 16 and 18 for the same purpose. Block segment 12, shown in FIG. 1, is provided with holes for bolts 30 and additional holes 34 for bolts which terminate within the segments 16, further serving to hold the block segments together.

Each block segment 12 defines first and second adjacent cylindrical bores 36 and 38 formed in the block segment about parallel axis A and B. As shown in FIGS. 1, 2, each block segment has a single end plate 42, with opposite surfaces 40, 40' of this end plate closing the bores formed in adjacent block segments. The central block segment 14 is identical to block segment 12, except it has two sets of rotors with an intervening dividing plate 42' serving to close one side of the bores for each set of rotors. The bores in the block segments at respective ends of the block are closed by additional closing plates 44.

Referring to FIGS. 1 and 2, the bores 36 and 38 on axes A and B are defined in each block segment 12, and on each side of block segment 14. In this preferred embodiment the bores have equal radius R and the axes of the bores are spaced a distance D apart, D being less than the sum of the radii of the adjacent bores, i.e. less than 2R. Typically for a small engine R may be 2 inches and D may be 3 inches. First and second rotors 50 and 52, respectively, are closed in bores 36 and 38, on fixed axes A and B respectively, and splined in identical angular position to rotor shafts 46 and 48, respectively, extending along those axes. (Shafts 46 and 48 are shown bored for oil feed lines.)

The rotor surfaces are specially constructed to form progressive rotor-to-rotor seals between the two rotors while each rotor also forms a rotor-to-bore-wall seal with the wall of its respective bore, these rotor surfaces adapted to serve as bounding surfaces in cooperation with relatively stationary surfaces of the bores to define chambers of changing volume.

Referring to FIG. 10, this relationship is realized by major and minor cylindrical surfaces, $C_L$ and $C_S$, respectively, each centered on the axis A of the rotor, and diametrically opposed, these surfaces being joined by cylindrical transition surfaces, $T_L$ and $T_F$, which are centered about points spaced from the axis of the rotor. The major and minor cylindrical surfaces have an equal arcuate extent, and the joining transition surfaces of each of the rotor similarly have equal arcuate extent. In the present embodiment, where the rotors are of identical size and designed to turn at identical speed, the center for each transition surface, of radius $R_T$, is located at the apex, $A_P$, formed at the intersection of the major cylindrical surface and the opposed transition surface. The minor cylindrical surface, $C_S$, has a radius substantially equal to the difference between the length of the line of centers of the rotors, D, and the radius, R, of the major cylindrical surface of the adjacent rotor.

Figure 5:
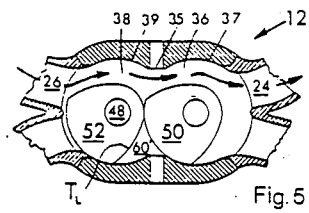
FIGS. 5 through 5f depict the engine segment of FIG. 1 showing the rotors in the various phases of operation of an upper chamber, from intake through exhaust.
Figure 5A:
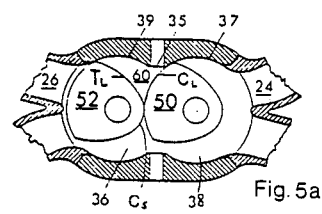
Figure 5B:
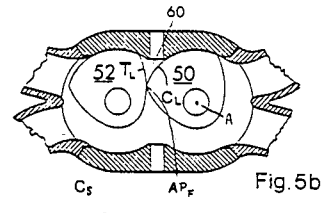
Figure 5C:
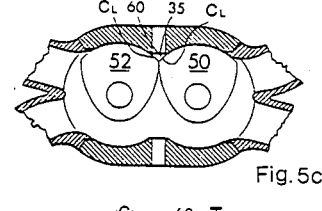
Figure 5D:
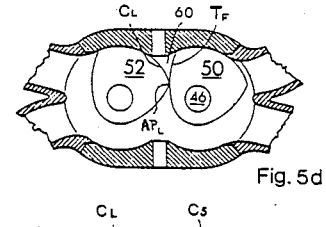
Figure 5E:
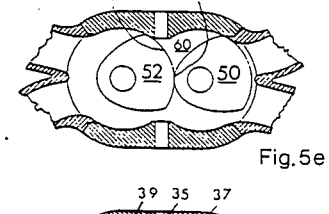
Figure 5F:
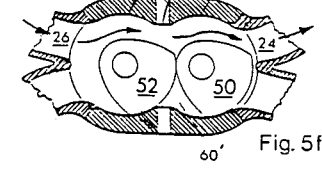
Figure 4:
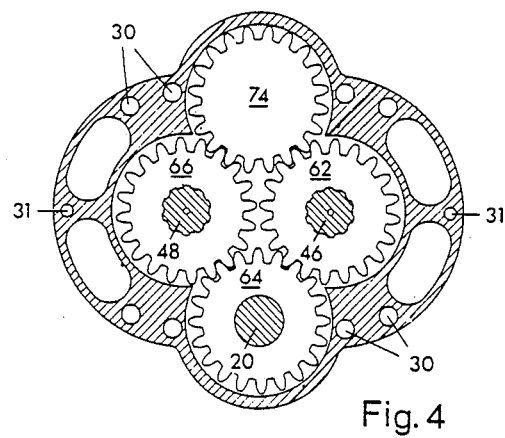
FIG. 4 is a cross-sectional view taken on line 4—4 of FIG. 3 showing gearing of the rotor shafts.

In FIGS. 5 through 5f, engine segment 12 of FIG. 1 is shown in reduced scale through a sequence of stages. Rotors 50, 52 rotate in a clockwise direction from the stage of flow of air through the engine prior to the combustion reaction in the upper chamber (FIG. 5) to the flow-through of air following combustion (FIG. 5f). The air removes exhaust gas from the upper chamber after combustion, cools internal surfaces of the engine and provides combustion air for the next cycle.

Referring now to FIG. 5, rotors 50, 52 in conjunction with surfaces 37, 39 of cylindrical bores 36, 38, respectively, and intervening surface 35 form a flow-through passage (shown by arrows) for cooling air from intake 26 to exhaust 24, which is supplied, e.g., by a blower (not shown). FIG. 5a shows rotors 50, 52 after clockwise rotation. Rotor 52 closes intake 26, while rotor 50 closes exhaust port 24 to form closed chamber 60, the coaction of the rotors trapping a volume of the flowing fluid within the chamber, which is defined by the leading transition surface, $T_L$, of rotor 52, the large cylindrical surface, $C_L$, of rotor 50, the cylindrical surface 39 of chamber 38, and the intervening surface 35 joining cylindrical surfaces 37, 39 of bores 36, 38. At this point, i.e. early in the compression stage, the small cylindrical surface, $C_S$, of rotor 52, contacts the large cylindrical surface of rotor 50, closing chamber 60.

Referring now to FIG. 5b, rotors 50, 52 have rotated to decrease the volume of chamber 60, by the relative motion of leading transition surface, $T_L$, on rotor 52 moving toward to large cylindrical surface, $C_L$, of rotor 50, compressing the fluid in the chamber. (Surface $C_L$, being progressive parts of a constant diameter cylinder centered on axis A does not affect the volume of chamber 60 during this compression stage.) At this point, the seal between the two rotors is formed by the trailing apex seal, $A_{PF}$, of rotor 50 contacting the leading transitional surface $T_L$ of rotor 52. Between the rotor positions in FIG. 5a and FIG. 5b, rotor 50 has come out of contact with the minor cylindrical surface, $C_S$, and into contact with the transition surface $T_L$ of rotor 52. As the apex seal contacts the opposed transition surface the critical compression stage begins.

Referring now to FIG. 5c, rotors 50, 52 have rotated to top center position and chamber 60, now formed by the major cylindrical surfaces, $C_L$, of both rotors and by the intervening surface 35 that joins the cylinder bores, is at minimum size and the contained fluid is at maximum compression. In the combustion engine, fuel is injected prior to this point and the air-and-fuel mixture compressed in the chamber is ignited. The inertia of the spinning rotors carries the rotors through the compression phase to the point of maximum compression (FIG. 5c).

Referring to FIG. 5d, expansion of chamber 60, now formed by major cylindrical surface, $C_L$, of rotor 52 and the following transitional surface, $T_F$, of rotor 50, begins. The seal between the rotor surfaces is made by the leading apex seal $A_{PL}$, of rotor 52 against the following transition surface, $T_F$, of rotor 50. The chamber is further defined by the intervening surface 35 and the cylindrical surface 37 of chamber 36. Expansion of the combusted gas acts against the following transitional surface, $T_F$, of rotor 50 to urge it to rotate about axis A, transmitting power through shaft 46 to power shaft 20 via gears 62, 64.

In FIG. 5e, chamber 60 has been expanded by rotation of the rotors to nearly maximum size, which typically can be larger than the compression chamber. The leading apex seal of rotor 52 has moved out of contact with the surface of rotor 50. The sealing contact in this area now being between the major cylindrical surface, $C_L$, of rotor 52 and the minor cylindrical surface, $C_S$, of rotor 50.

It should be noted that the ratio of compression to expansion depends upon the arcuate locations of the points where a seal is first and last made. In this embodiment, as best seen in FIG. 1, the lip 27 of the intake manifold fairs into the cylindrical surface of the bore, whereas the lip 25 of the exhaust manifold defines a cylindrical extension of the bore. Because the portions of bores 36 and 38 defined by the housing are equal, the bore extension provided by the exhaust manifold extends the expansion and the ratio of compression to expansion is therefore less than one.

In FIG. 5f, the rotors form, with the bore surfaces 37, 35, 39, a flow-through path for flow of air from intake 26 to exhaust 24. The flow of air through this path removes combustion products, and also cools the engine.

It is characteristic of the machine that the compression and expansion chambers just described, once formed, continuously change in volume, and the duration between final compression and initial expansion is only for an instant, (e.g. there is no extended transfer period or the like between the two) and thus work can be performed in an efficient manner.

Referring back to FIG. 5, a similar cycle of compression, ignition and expansion takes place in the lower chamber 60', occurring exactly 180° out of phase with the upper chamber, with expansion of the ignited mixture acting on the trailing transition surface, $T_L$, of rotor 52 to transmit power through shaft 48 to power shaft 20 through gears 66, 64. Where the engine block 10 is made up of six such rotor pairs, as shown in FIG. 3, each of the rotor pairs is 120° out of phase with adjacent rotors in order to form a dynamically balanced engine. Segment 16 (FIG. 4) also includes an additional idler gear 74, to allow application of static torque to prevent backlash of the gears for better synchronization of the rotors. Also, use of idler gears distributes the power load for better efficiency.

Referring to FIG. 1a, in bore 38, the bore cylindrical surfaces 27, 39 and 25, 37 are defined in part by variable members 1002 which are movable toward or away from rotors 50, 52 in a manner to vary the rotational angle at which the sealed relationship between apex seals 82 of rotors 50, 52 and the bore surfaces 27 begin and define the maximum confined initial volume of the chamber. This in turn provides the engine with a variable compression ratio, i.e. the ratio between the volume of the combustion chamber when it is first formed (FIG. 5a) and the volume of the chamber at the time of ignition, typically approximately at the point of minimum chamber volume (FIG. 5c).

In FIG. 1a, the members 1002 are in the maximum chamber position, with arcuate surfaces 1004 disposed for initial sealing contact with seals 82 at the earliest point, e.g. as also shown in FIG. 1. Downstream ends 1006 of variable members 1002 provide smooth transition onto fixed bore surfaces 1008, with surfaces 1010 contacting the curved surfaces 1012 of the fixed portions. At the upstream ends 1014 of variable members 1002, flexible fairing members 1016 also provide smoothly curved surfaces.

Variable member 1002 is constructed to pivot about axis V located to the right of a line between the rotor axis and the end of movable surface 1004 closest to the pivot axis V. Member 1002 is selectively positioned by means of piston 1018 on the basis of engine operating conditions. Typically, the controlling condition is engine speed, with arcuate surfaces 1004 displaced to avoid early sealing contact at slower speeds, but other factors may be considered. If desired, the controlling factors can be evaluated by computer, shown in dashed line, which in turn controls the positions of surfaces 1004.

Figure 1C:
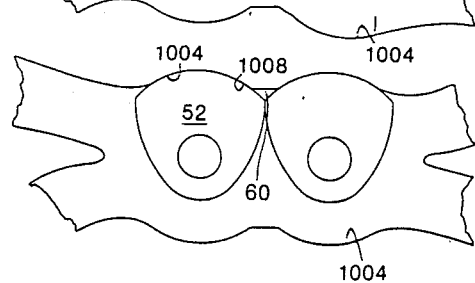

Referring to FIGS. 1b and 1c, during operation at low power needs, arcuate surfaces 1004 are disposed at positions for delayed sealing contact, (FIG. 1b). In a typical engine, an example of the compression ratio would be 3:1:10.35 (initial confined volume: minimum confined volume: final confined volume) and the peak pressure before ignition would be about 430 psia. The engine would be very efficient during periods of low power need due to the enormous expansion ratio, and would be very quiet due to mild combustion shock and low pressure exhaust. The exhaust pressure would be about two atmospheres versus $5\frac{1}{2}$ atmospheres in typical piston engines.

In FIG. 1c, the arcuate surfaces 1004 are disposed for early sealing contact and maximum compression rates for operation at higher engine speeds. In a typical engine, an example of compression ratio would be 9:1:10.35, with maximum pressure about 1437 psia, for driving and accelerating power.

Figure 2A:
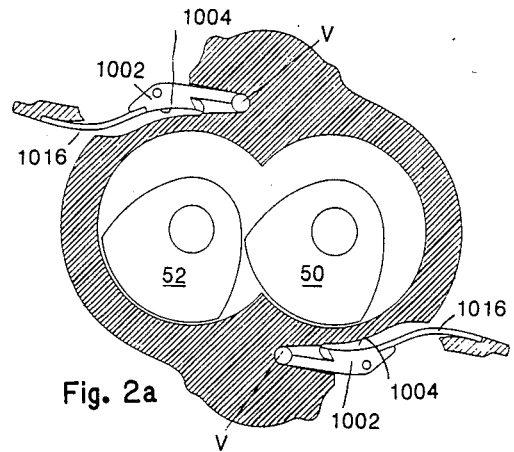

In FIG. 2a, a different sectional view of the rotary engine operating at low speeds is shown with variable member 1002 in retracted position, and in FIG. 3a, a chamber engine block with variable compression is shown.

Figure 1D:
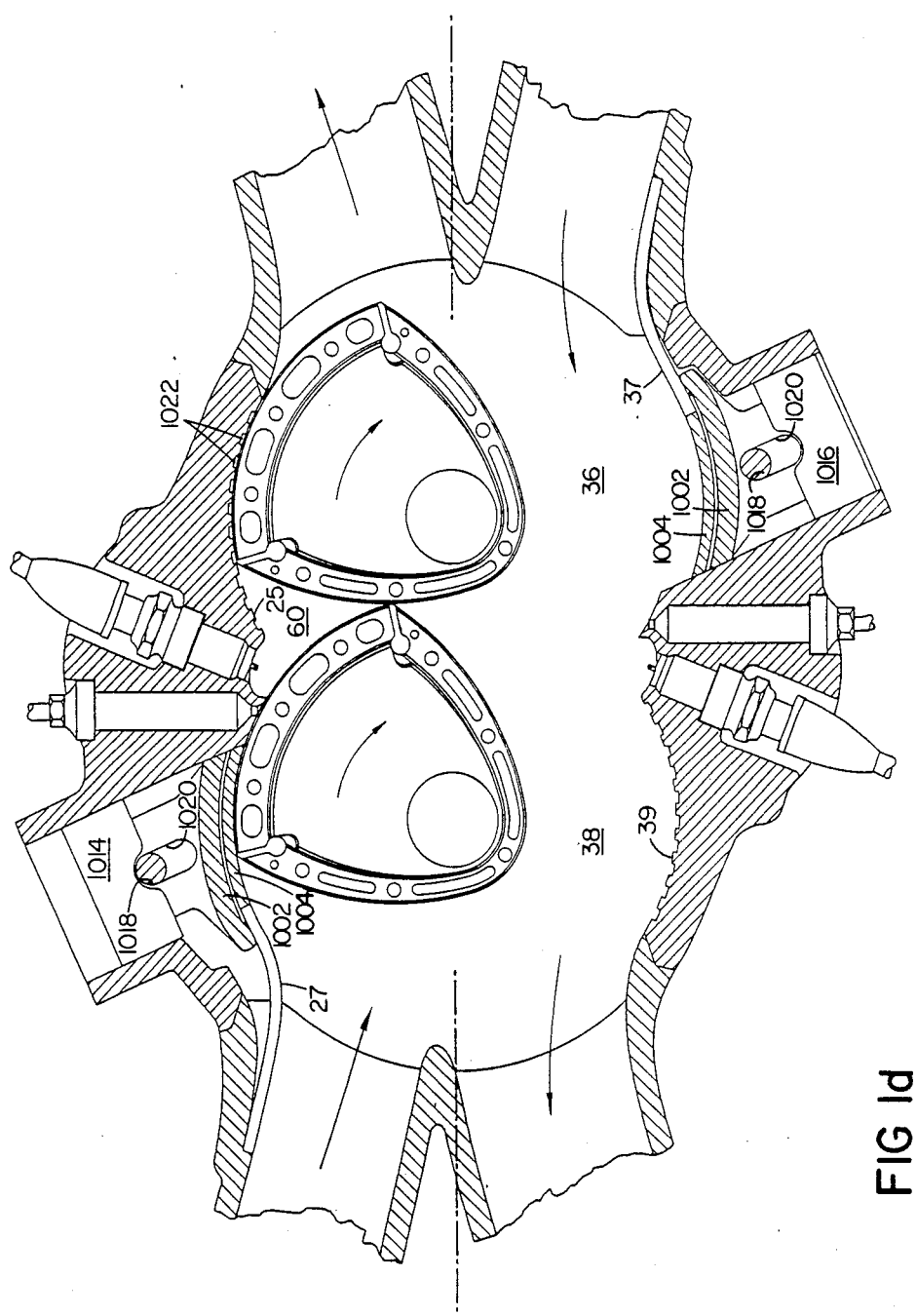
FIG. 1d is a view similar to that in FIGS. 1 and 1a of another variable compression engine construction.

In FIG. 1d, another construction with the bore cylindrical surfaces 27, 39 and 25, 37 defined by variable members 1002 is shown. Hydraulic pressure is applied to surface 1014 of piston 1016 to urge it against the surface of asymmetrical cam 1018 in aperture 1020. The rotational position of cam 1018 controls the adjustment of surface defining bore 36, 38. Typically the contact surface 1004 is a soft material, e.g. nickel, aluminum or plastic, to allow it to wear to fit. Movement of the contact surface is linear, with no provision for smooth transition between downstream surfaces. During high compresion engine operation, e.g. above 3,000 r.p.m., the clearance between adjacent surfaces would be lowered to less than 0.001 inches (0.025 mm). It is anticipated an automobile engine equipped with this system would require tuning only every 60,000 miles (96,500 km).

Referring now to FIG. 6, a single rotor 50, identical to the rotors described above, is shown in detail with spline teeth and face seal labyrinths omitted. It comprises rotor body 80 to which are attached apex seals 82 and face seals 84, 86. At the apex of the rotating surfaces of rotor 50, i.e. at the intersection of the major cylindrical surface, $C_L$, and the transition surface, T, a special apex seal 82 is located in rotor aperture 88. Apex seal 82 is a moveable sealing member having sealing surface 90 (FIG. 8) adapted to contact the opposed surface 92 of the opposite rotor 52 and apply an outward sealing pressure against that surface. The sealing pressure applied by surface 90 decreases in magnitude with the increase in rotational velocity of rotor 50. Apex seal 82 has a moveable tail portion 94 that is free to slightly swing between a first position $P_1$ (FIG. 9) and a second position $P_2$ (shown in dashed line) about a pivot region positioned inwardly from the periphery of the rotor.

Referring to FIG. 7, each apex seal 82 consists of upper and lower sealing members 81, 83 urged axially apart by corrugated spring 96 which urges face surfaces 98, 100 of members 81, 83 into sealing contact with the opposed end surfaces 40, 40' (not shown here) of bore 36. Leakage through the spring compartment is restricted by an overlap of the joint between members 81, 83 at the exposed axial surfaces 90, 91 (FIGS. 7 and 7a, and shown in dashed lines in the axial direction FIG. 8).

In the preferred embodiment, the apex seal member 82 has an enlarged head portion 102 to which the tail portion 94 is joined.

Head 102 is fixed against radial movement but is allowed to rotate about axis X. Aperture 88 of rotor 50 is sized with some slight clearance (C, FIG. 9, e.g. 0.007 inch) to allow the tail portion 94 of seal 82 to rotate slightly about the axis X between a first (rest) position $P_1$, and a second (high speed) position $P_2$. In the rest position, the tail portion 94 is biased toward position $P_1$ by spring 108 (FIGS. 7a and 8) disposed in the rotor 50. As shown in FIG. 7a, spring 108 is a mildly corrugated thin piece of metal.

Axis X of head 102 lies on a radius $R_x$ of rotor 50 (FIGS. 9, 10) which is offset from the center of mass of the sealing member, either considering the entire mass of the member or the mass of the non-balanced tail portion 94. In FIGS. 9 and 10 radius $R_{cm}$ is shown projected through the center of mass cm, of the non-balanced portion.

At rest, or at slow speeds, spring 108 biases the tail portion 94 of seal 82 toward position $P_1$, FIG. 9, where sealing surface 90 exerts maximum contacting pressure on the opposing surface 92 (transition surface T). As rotor speed increases, centrifugal force, $F_C$, FIG. 9a, effectively acts at the center of mass cm. As shown, the centrifugal force has a radial component, $F_{CR}$, which has no effect on seal position, and a tangential component, $F_{RT}$, which tends to move the center of mass, $C_M$, of the seal to overcome the opposed spring force, $F_S$, thus moving the sealing surface 90 toward position $P_2$ (a movement shown exaggerated in FIG. 9). This movement reduces the contacting force $F_{CP}$ exerted by the sealing surface 90 on the opposed surface 92 as speed increases.

In operation at slow speeds, where the compression-/expansion cycle of the machine takes a relatively long period of time, it is necessary that the seal between the apex of one rotor and the transition surface of the opposed rotor be tightly maintained, e.g. to avoid leakage and lost power. The spring 108 enables the apex sealing surface 90 to exert the required contact force $F_{CP}$ against the opposed transition surface 92. As rotational speed increases, the time duration of the cycle decreases, there is less time for leakage to occur, hence seal contact pressure becomes less critical. The novel seal relaxes this seal pressure and thus reduces efficiency loss that otherwise would occur due to friction.

Further, the seal pressure may be made to vary with inverse relationship to the size of the chamber. In the preferred embodiment, because the seal member is biased mainly in the tangential direction relative to its rotor, the effective lever arm $L_n$ of the contact force $F_{CP}$ is greatest in the rotor position of FIG. 5c where the chamber volume is smallest. Contrariwise, when the chamber is largest, i.e. when the seal member approaches alignment with the line of centers, between FIGS. 5d and 5e, this lever arm is minimal. The total sealing pressure is also affected by friction effects that are taken into account in the design, bearing in mind that though the friction force tending to drag the seal open is also lowest in the position between FIGS. 5d and 5e the effective lever arm for this force is at a maximum, and vice versa with respect to the position of FIG. 5c.

Figure 8A:
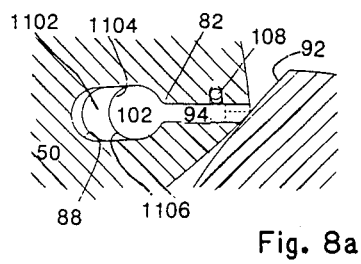
Figure 8B:
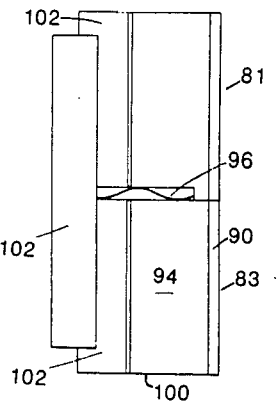
FIG. 8b is a side plan view of the seal with restraining means.

Referring to FIG. 8a, apex seal 82 is shown positioned in rotor 50 which in this case has an enlarged aperture 88' for head 102. Also disposed in aperture 88' is restraint or damping means 1102 which has an arcuate surface 1104 complementary to the surface 1106 of seal head 102. A biasing means (not shown) urges the arcuate surface 1104 of restraint means 1102 into friction-brake contact.

At low rotational speed, the force of surface 1104 against seal 82 is not sufficient to prevent the centrifugal force generated by rotation of rotor 50 from overcoming the force of spring 108 to retract the sealing surface 90 for reduced sealing contact on opposed surface 92. As the rotational speed increases, the braking force of arcuate surface 1104, caused by centrifugal force acting on the mass of restraint means 1102 urging it outward, on the surface 1106 of apex seal 102, retards, and at sufficiently high speeds eliminates, rotation of the seal in aperture 88' holding sealing surface 90 in the retracted position between sealing contacts in the make-and-break contact cycle to maintain proper alignment for the next contact to thereby reduce initial contact pressure and also prevent introduction of vibration.

Referring now to FIGS. 10, 11 and 12, the face surfaces 116, 116' of rotor 50 are sealed against the opposed end surfaces 40, 40' of the bore by means of flat plate seals 84, 86, as well as surfaces 98, 100 of apex seals 82 discussed above. Referring to FIG. 11, seal 84, and similarly seal 86, is comprised of two substantially flat, plate-form members 118, 120 at each surface, the outer surface of member 118 forming the contacting surface 122 between the rotor and the bore wall 40, 40'. The inner surface 124 of member 118 and the outer surface 126 of member 120, and inner surface 128 of member 120 and surface 130 of the rotor body 80 form additional contacting surfaces. By using two members 118, 120, the clearance between rotor surface 116 and bore surface 40 is divided into segments which are, of course, smaller than the total clearance and thus are more restrictive, due, e.g. to viscous friction, to gas flow between the opposing surfaces. The surfaces of member 118 and member 120 also contain grooves 132 running substantially parallel to the cylindrical surfaces of the rotor. These grooves are divided from each other by ridges 134 of reduced clearance with the opposed surface, thus forming chambers or recesses for cascading pressure from the region of high pressure to the region of lower pressure (sometimes referred to as labyrinth seals). The chambers between member 118 and the bore surface 40, 40', between members 118, 120, and between member 120 and the rotor surface 130 are also connected by means of axial holes 136, 138 which enable a balancing of pressure between the individual parts. This balancing of pressure between the axially oriented chambers in effect serves to force members 118 and 120 apart to balance the clearance gaps between the individual surfaces whereby the leak through each path is substantially equal and the overall leakage in this region is reduced from what would occur if a single gap were employed. FIG. 12 is similar to FIG. 11 showing the members 118, 120 of the flat plate seals at a different position about the rotor axis. Pin 140 holds the seals 84, 86 to the rotor body 80.

Referring to FIG. 10a, bias means 1202 for retractably biasing face seal 84' toward a complementary bore surface is shown. Referring also to FIGS. 11a and 12a, bias means 1202 is a relatively flat sheet of corrugated spring steel fixed at point Q to retaining pin 140' which in turn is fixed in the rotor body 80'. Face seal 84', through which retaining pin 140' passes, rests on the opposed ends 1204, 1206 of bias means 1202 which at rest urge the seal 84' into sealing contact with the complementary bore surface (not shown). Sealing contact is achieved along surfaces 122' while most of the intervening portion of the seal is apertured (1208) to prevent pressure differential between the face seal surfaces.

Referring to the force diagram in FIG. 10b, bias means 1202, which has dimensional extent both along the rotor radius, $R_R$, and also perpendicular thereto $P_R$, is fixed to the rotor at point Q along the length of the bias means closer to the inner end from its center of mass. As the rotational speed of the rotor increases, centrifugal force, $F_{CM}$, acts on the perpendicular dimensional component of the spring outward of the point of attachment to overcome spring force $F_S$, and reduce the perpendicular component. (The portion of the spring lying inwardly at the point of attachment is also urged outward by the centrifugal force generated.)

As the perpendicular dimensional component of the spring is reduced, the biasing force of the spring against the face seal is also reduced as is the contacting force of the sealing surfaces against bore wall. Thus, frictional contact is reduced at higher engine speeds when, due to the shortened cycle time, reduced sealing is required.

In another embodiment (FIG. 11b), two bias means 1202', 1202" may be used to bias two overlying face seals 118', 120' to divide the clearance for reduced leakage, as discussed above relative to FIG. 11.

Referring to FIGS. 20, 21 and 22, a face seal 1302 without a flush radial surface is shown. Arcuate face seal 1302 lies within an arcuate aperture 1304 disposed inward from the radial surface 1306 of rotor 1308. Over its major length, seal 1302 fits into aperture 1304 with tight clearance to provide a tortuous path for gas leakage around the seal. At spaced points along the aperture, retaining pins 1310 are provided with attached bias means 1312 that apply biasing force to seal 1302 toward the complementary bore surface 1314. As discussed above, centrifugal force generated by increased rotor rotational speed cause bias means 1312 to apply reduced force to the seal.

Referring back to FIG. 1d, and also to FIGS. 12b, c, d and e, a track sealing system for retarding leakage from fluid chamber 60 is shown. Defined in the surface 25 of bore 36 are a series of parallel grooves 1022 lying generally coaxial with the bore, and perpendicular to the direction of rotation of rotor 50. The size, shape and arrangement of the grooves varies with application. In a typical compression engine (shown) the grooves are about 0.125 inches (3.2 mm) deep, and have approximately the same width, W. The distance between grooves Y, is about equal to W, or slightly less. The relationship of the close-mated surfaces of the moving rotor and the fixed bore surface defining the grooves are shown in enlarged scale in FIGS. 12b and 12d, to which we now refer.

In the preferred compression engine, chamber 60 is at a pressure, $P_c$ relatively higher than port 24. Fluid under pressure in chamber 60 leaks through the gap 1024, typically between about 0.004 to 0.007 inches (0.10 to 0.18 mm), between the moving surface of rotor 50 and the fixed bore surface 25 in the direction indicated by arrow L. Leakage beyond the first groove is somewhat limited as the leaking fluid fills and pressurizes the relatively large volume, compared to the narrow gap, of the groove to a pressure, $P_1$, approaching, but slightly below the chamber pressure $P_c$. Pressurization of the grooves occurs progressively as shown by the bar graph of pressure in FIG. 12c. If the opposed bore and rotor surfaces were fixed relative to each other, the pressure in the gap and grooves would stabilize quickly at a pressure close to that of the chamber, $P_c$. However, movement of rotor 50, see FIG. 12d in which the chamber has enlarged due to rotor movement and the pressure has correspondingly decreased to $P_c'$, causes each groove progressively to be reexposed to the chamber. As shown in FIG. 12d, pressure $P_1$ in the first groove, now exposed, equals the chamber pressure, $P_c'$.

In this manner, the cascade of grooves is reexposed more quickly than the pressure of leaking fluid can advance along the gap between the opposed surfaces, and lost mass is recovered to the system.

FIG. 13 shows an alternate embodiment of the engine of FIG. 1, with three rotors 150, 152, 152' rotating in phase in the same direction. By use of an additional rotor 152', a second chamber 160a, 160a' (only chamber 160a' in the lower phase is shown) is formed simultaneously in each stage of rotation, i.e. in FIG. 13 the engine is forming two compression chambers 160' and 160a'. At the same time, a flow-through path from intake 126 to exhaust 124 is formed across the top of the rotors again as in FIG. 1. An engine of this embodiment would typically provide greater power output for the weight of engine machinery required, as compared to the embodiment of FIG. 1.

FIG. 14 shows a fluid pressure pump 210. In the upper phase (shown), fluid taken into the engine through intake 226 is pressurized in chamber 260 by action of rotors 250, 252. Valving means 228 remains closed until the desired degree of compression of the fluid in chamber 260 is achieved, e.g. if the fluid is substantially noncompressible, e.g. water, valving means 228 will open almost immediately and the compressive action of the device will be used to squeeze the liquid forcefully through exit port 224. If the fluid is compressible, valving means 228 will remain closed until the fluid is substantially compressed, e.g. until rotor 250 and rotor 252 reach a point close to maximum compression. Compression in chamber 260 is achieved by the combined action of the rotors 250 and 252 with the cooperative surfaces of engine 210 to reduce the size of chamber 260 to its minimum point. A similar process would occur in the lower phase, i.e. 180° out of phase with the process just described, with the valving means 228' acting to allow compressed fluid in chamber 260' to exit.

Referring to FIG. 15, a device 310 similar to the fluid pressure pump of FIG. 14 is shown. However, in this embodiment the rotors 350, 352 rotate in a counter clockwise direction thus causing chamber 360 to expand in size. As chamber 360 is enlarged by rotation of the two rotors, valving means 328 activates to allow fluid to be drawn through intake 326 into chamber 360. The rotation of rotor 350 creates a lowered pressure in chamber 360 which upon opening of the valving means induces fluid to enter chamber 360. Again a similar process would take place 180° out of phase in lower chamber 360'.

Referring to FIGS. 16–16c, a pump 410 with simultaneous suction and pumping phases suitable for pumping fluid, e.g. for use as a circulation pump, is shown. The pump comprises rotors 450, 452, slightly different in configuration from the rotors of FIG. 1 to accommodate a closer spacing of the rotor axes in this embodiment (closer spacing enabling increase of pumping flow versus size of overall machine). The rotors rotate in phase in the same direction and at the same speed, and intake and exhaust ports 426, 426' and 424, 424', respectively, are provided, each with an associated one-way-valve 425. In FIG. 16, chamber 460, sealed by the surfaces of the rotors and the block, is decreasing in volume to force fluid out through one-way exhaust 425 and port 424 while the back volume draws fluid in primarily through intake port 426'. In FIG. 16a, both upper chambers 460 and 460a are at minimum volume. In FIG. 16b, chamber 460a is expanding in volume to draw fluid into the pump through one-way intake valve 425 and port 426 while fluid is exhausted from the back volume primarily through exhaust port 424'. In FIG. 16c, chamber 460a' is nearly sealed by the rotor surfaces for exhaust of fluid through valve 424'.

FIG. 17 shows an internal combustion engine 510 of operation similar to FIG. 1. However, in this embodiment rotors 550, 552 are of different size. Both rotors move in the same direction at the same revolutionary speed, i.e. same rpm, but have different surface speeds. Operation of this device is the same as the earlier embodiments.

The seals of this embodiment illustrate some of the variations that can be used to advantage. The seals 582 of the smaller rotor are of cantilever form, the larger root portion 502 being fixed to rotor 552, and the slender tail portions 504 being spring cantilever extensions integral with root 502, but free to deflect within a range of clearance provided by the slot in the rotor through which they extend. The ends of these extensions form seals as in the previously described embodiment, FIGS. 7–9a.

The leading seal 584 of the larger rotor in FIG. 17 is an inertial seal, specially constructed to cause the seal surface to radially retract between rest and high speed positions. This seal member can form effective seals both with the rotor and bore surfaces at respective stages of rotation. This is accomplished by selected location of the seal surface and the center of the mass. The radius $R_x'$ is projected from the rotor center to the pivot axis $X'$ for the seal member. The center of mass cm' of the seal member lies to one side of this radius while the sealing surface lies to the other side. Thus, as rotor speed increases and spring force F is progressively overcome, the center of mass cm' moves toward alignment with radius $R_x$ (and toward the large cylindrical surface) while the sealing surface rotates away from that radius in the rotational direction opposite direction opposite to that of rotor 550, to a position closer to the center of the rotor 550 and away from the surfaces against which it seals. In this case both the frictional and effective intertial forces act in the same direction.

The trailing seal 588 is similar to seal 584 positioned in a way to be effective with the bore 537 and the opposed rotor. It also rotates, with increase in speed, in direction opposite to that of the rotor, in this case away from the large cylindrical surface, toward the following transitional surface.

FIG. 18 shows still another embodiment of a device 610 according to the invention. In this embodiment, three rotors 650, 652, 652' rotate in the same direction but at different rpm, e.g. center rotor 650 turns at one half the revolutionary speed of rotors 652, 652' Rotors 652, 652' are 180° out of phase, but operate at the same position on the cycle, i.e. simultaneously form compression and expansion chambers 660, 660a' with the surface of center rotor 650.

OTHER EMBODIMENTS

Other embodiments of the invention are within the following claims. For example, various rotor shapes and multiple rotor configurations are anticipated within the invention, e.g. where the application dictates, the small cylindrical surface may not be configured for sealing contact with the opposed large cylindrical surface, or the apex seal may not trace the point of contact with the opposed transition surface. As shown in FIG. 17, the apex seal 582 may be in the form of a cantilevered member 504 with the head portion 502 fixed against rotation, also the head portion may be fixed to the rotor surface, e.g. by a screw. The labyrinth effect employed for the seals on the rotor faces could also be employed on the cylindrical surfaces by means of axially alinged recesses 532 on the major cylindrical surfaces disposed for rotor-to-bore wall sealing relationship during critical periods of compression and/or expansion. The intake and/or exhaust ports could be aligned axially. Also, variable members may be used to define a portion of the bore wall on the expansion side of the machine, e.g. for an expansion machine, or may be used on both sides, e.g. to vary the timing and rotational angle of the cycle, or could be used in other types of rotary devices or engines. Referring to FIG. 19, a rectilinear head 102' may be used on apex seal 82' to fix the bias of the flexible tail 94' in the rest position, without requiring a contact spring. The damping or restraint means could be made adjustable by allowing variation of the position of the friction brake contact surface on the seal surface relative to the rotor radius, i.e. the clamping force generated is greater where the surface is perpendicular to the radius as opposed to some other angle approaching parallel. The clamping or restraint means could also be used in other types of rotary devices or engines, e.g. of the Wankel type, to temporarily fix or restrain a seal to reduce contact at higher speeds. The bias means sensitive to centrifugal force could be used to retract or project seals or other surfaces in other types of rotary devices or engines.

What is claimed is:

1. In a rotary device that includes a movable sealing member having a contacting surface adapted to form a seal with an opposed surface during rotation of said rotor, the improvement wherein said sealing member comprises a movable tail portion defining said contacting surface, said sealing member being disposed in an aperture of said rotor with said movable tail portion in a first position in the rotor aperture, said contacting surface to bear with pressure against said opposed surface, said movable tail portion being free to shift in said aperture toward a second position in a movement which progressively relieves the pressure of said contacting surface against said opposed surface, said movable tail portion being constructed and arranged in response to increased speed of rotation of said rotor to move toward said second position thereby to relieve sealing pressure as speed of said rotor increases, the mass distribution of said movable tail portion relative to the position of surfaces defining said rotor aperture causing said sealing member movable tail portion to move in a manner to relieve said sealing pressure as a result of inertial effects as said speed increases, the movable tail portion of said sealing member being free to slightly swing between said first and second positions about a pivot region disposed inwardly from the periphery of said rotor, said pivot region being offset from a radius of said rotor that projects to the center of mass of said movable tail portion.

2. The rotary device of claim 1 wherein said center of mass and said contacting surface lie to the same side of a radius of said rotor that projects through said pivot region.

3. The rotary device of claim 1 wherein said movable tail portion of said sealing member comprises a cantilever spring portion capable of flexing generally in said pivot region in response to said centrifugal effects.

4. The rotary device of claim 1 wherein said movable tail portion of said sealing member comprises a rigid element extending outwardly from a rotary pivot bearing.

5. The rotary device of claim 1 wherein said rotor has a major cylindrical surface, a minor cylindrical surface and at least one arcuate transitional surface therebetween, and said contacting surface in said second position is disposed in a direction toward said major cylindrical surface of said rotor, relative to said first position.

* * * * *